US009018309B2

(12) United States Patent
Gurevich et al.

(10) Patent No.: US 9,018,309 B2
(45) Date of Patent: Apr. 28, 2015

(54) FLUORINE-CONTAINING ELASTOMER COMPOSITIONS SUITABLE FOR HIGH TEMPERATURE APPLICATIONS

(75) Inventors: Eugene Gurevich, Coopersburg, PA (US); Brian Ux, Red Hill, PA (US); Jiazhong Luo, Lansdale, PA (US); Wonmun Choi, Kumamoto (JP)

(73) Assignee: Greene, Tweed Technologies, Inc., Wilmington, DE (US)

(*) Notice: Subject to any disclaimer, the term of this patent is extended or adjusted under 35 U.S.C. 154(b) by 0 days.

(21) Appl. No.: 13/237,884

(22) Filed: Sep. 20, 2011

(65) Prior Publication Data

US 2012/0077935 A1    Mar. 29, 2012

Related U.S. Application Data

(60) Provisional application No. 61/386,465, filed on Sep. 24, 2010.

(51) Int. Cl.
  *C08F 214/26*    (2006.01)
  *C08L 27/12*    (2006.01)
  *C08G 75/02*    (2006.01)
  *C08L 27/18*    (2006.01)
  *C08K 5/16*    (2006.01)

(52) U.S. Cl.
  CPC . *C08L 27/18* (2013.01); *C08K 5/16* (2013.01); *C08L 2205/02* (2013.01); *C08L 2205/03* (2013.01)

(58) Field of Classification Search
  USPC .................... 525/199, 200; 524/520, 521
  See application file for complete search history.

(56) References Cited

U.S. PATENT DOCUMENTS

| | | | |
|---|---|---|---|
| 3,484,503 A | 12/1969 | Magner et al. |
| 3,546,186 A | 12/1970 | Sullivan Raymond et al. |
| 3,723,577 A | 3/1973 | Stivers |
| 4,281,092 A | 7/1981 | Breazeale |
| 4,413,094 A | 11/1983 | Aufdermarsh, Jr. |
| 4,469,846 A * | 9/1984 | Khan et al. ............. 525/72 |
| 4,713,418 A | 12/1987 | Logothetis et al. |
| 5,260,351 A | 11/1993 | Logothetis |
| 5,447,993 A | 9/1995 | Logothetis |
| 5,621,145 A | 4/1997 | Saito et al. |
| 5,637,648 A | 6/1997 | Saito et al. |
| 5,668,221 A | 9/1997 | Saito et al. |
| 5,672,758 A | 9/1997 | Sonoi et al. |
| 5,677,389 A | 10/1997 | Logothetis et al. |
| 5,688,872 A | 11/1997 | Sonoi et al. |
| 5,696,189 A | 12/1997 | Legare |
| 5,700,879 A | 12/1997 | Yamamoto et al. |
| 5,767,204 A | 6/1998 | Iwa et al. |
| 5,824,749 A | 10/1998 | Sonoi et al. |
| 5,831,127 A | 11/1998 | Saito et al. |
| 5,874,523 A | 2/1999 | Schmiegel |
| 5,891,941 A | 4/1999 | Tanaka et al. |
| 6,211,319 B1 | 4/2001 | Schmiegel |
| 6,310,142 B1 | 10/2001 | Apostolo et al. |
| 6,323,283 B1 | 11/2001 | Apostolo et al. |
| 6,395,834 B1 | 5/2002 | Albano et al. |
| 6,518,366 B1 | 2/2003 | Irie et al. |
| 6,602,961 B1 | 8/2003 | Saito et al. |
| 6,638,999 B2 | 10/2003 | Bish et al. |
| 6,710,132 B2 | 3/2004 | Apostolo et al. |
| 6,730,760 B2 | 5/2004 | Grootaert et al. |
| 6,737,479 B2 | 5/2004 | Faulkner |
| 6,750,295 B2 | 6/2004 | Albano et al. |
| 6,822,050 B2 | 11/2004 | Albano et al. |
| 6,841,625 B2 | 1/2005 | Irie et al. |
| 6,844,036 B2 | 1/2005 | Apostolo et al. |
| 6,855,774 B2 | 2/2005 | Kawasaki et al. |
| 6,878,778 B1 | 4/2005 | Kawasaki et al. |
| 6,890,995 B2 | 5/2005 | Kolb et al. |
| 7,019,083 B2 | 3/2006 | Grootaert et al. |
| 7,247,749 B2 | 7/2007 | Aufdermarsh et al. |
| 7,354,974 B2 | 4/2008 | Takahashi et al. |
| 7,476,711 B2 | 1/2009 | Takahashi et al. |
| 7,514,506 B2 | 4/2009 | Mansfield et al. |
| 7,521,510 B2 | 4/2009 | Aufdermarsh et al. |
| 2001/0047048 A1 | 11/2001 | Saito |

(Continued)

FOREIGN PATENT DOCUMENTS

| | | |
|---|---|---|
| CN | 1387551 A | 12/2002 |
| JP | 11-092529 A1 | 4/1999 |
| JP | 2000-239321 A | 9/2000 |
| JP | 2002-12727 A | 1/2002 |
| JP | 2002-293831 A | 10/2002 |
| JP | 2003-171519 A | 6/2003 |
| JP | 2004-500459 T | 1/2004 |

(Continued)

OTHER PUBLICATIONS

PCT International Search Report and Written Opinion dated Feb. 15, 2012, 6 pages.
Japan Official Action dated Sep. 3, 2014, 3 pages.

*Primary Examiner* — Nathan M Nutter
(74) *Attorney, Agent, or Firm* — Flaster/Greenberg, P.C.

(57) ABSTRACT

A curable fluorine-containing elastomer composition is described which includes a first curable perfluoropolymer comprising tetrafluoroethylene, a first perfluoroalkylvinyl ether and at least one first cure site monomer having at least one cure site, wherein tetrafluoroethylene is present in the first curable perfluoropolymer in an amount of at least about 50 mole percent; a second curable perfluoropolymer comprising tetrafluoroethylene, a second perfluoroalkylvinyl ether and at least one second cure site monomer having at least one cure site, wherein the second curable perfluoropolymer comprises fluoroplastic particles therein; and at least one curative. Cured compositions and molded articles formed from such compositions are also disclosed.

28 Claims, No Drawings

(56) References Cited

U.S. PATENT DOCUMENTS

| | | |
|---|---|---|
| 2002/0026014 A1 | 2/2002 | Bish et al. |
| 2004/0024133 A1 | 2/2004 | Hetherington |
| 2004/0122163 A1 | 6/2004 | Grootaert et al. |
| 2004/0122182 A1 | 6/2004 | Kawasaki et al. |
| 2004/0147676 A1 | 7/2004 | Irie et al. |
| 2005/0107544 A1 | 5/2005 | Wang |
| 2005/0261431 A1 | 11/2005 | Takahashi et al. |
| 2006/0148991 A1 | 7/2006 | Aizawa et al. |
| 2006/0292373 A1 | 12/2006 | Kuboyama et al. |
| 2007/0049698 A1 | 3/2007 | Grootaert et al. |
| 2008/0035883 A1 | 2/2008 | Andreevich et al. |
| 2008/0097035 A1 | 4/2008 | Takahashi et al. |
| 2008/0287627 A1 | 11/2008 | Noguchi et al. |
| 2009/0253854 A1 | 10/2009 | Xu et al. |
| 2009/0306296 A1 | 12/2009 | Nanba et al. |
| 2009/0312473 A1 | 12/2009 | Kanega et al. |
| 2010/0093898 A1 | 4/2010 | Campbell et al. |
| 2010/0151254 A1 | 6/2010 | Luo et al. |
| 2011/0086229 A1* | 4/2011 | Noguchi et al. ............ 428/421 |
| 2012/0100379 A1* | 4/2012 | Luo et al. .................... 428/421 |

FOREIGN PATENT DOCUMENTS

| | | |
|---|---|---|
| JP | 2006-511660 | 4/2006 |
| JP | 2007-137994 A | 6/2007 |
| JP | 2007-538142 T | 12/2007 |
| JP | 2010-525103 A | 7/2010 |
| KR | 10-2007-0021267 | 2/2007 |
| WO | WO 00/08076 A1 | 2/2000 |
| WO | WO 00/29479 A1 | 5/2000 |
| WO | WO 01/23470 A1 | 5/2001 |
| WO | WO 02/060969 A1 | 8/2002 |
| WO | WO 2004/060944 A1 | 7/2004 |
| WO | WO 2006/057666 A1 | 6/2006 |
| WO | WO 2006/120882 A1 | 11/2006 |
| WO | WO 2008/130557 A1 | 10/2008 |
| WO | WO 2010/076876 A1 | 7/2010 |
| WO | WO 2010/076889 A1 | 7/2010 |

* cited by examiner

FLUORINE-CONTAINING ELASTOMER COMPOSITIONS SUITABLE FOR HIGH TEMPERATURE APPLICATIONS

CROSS-REFERENCE TO RELATED APPLICATIONS

This application claims the benefit under 35 U.S.C. §119(e) of U.S. Provisional Patent Application No. 61/386,465, filed Sep. 24, 2010, entitled "Fluorine-Containing Elastomer Compositions Suitable for High Temperature Applications," the entire disclosure of which is incorporated herein by reference.

BACKGROUND OF THE INVENTION

1. Field of the Invention

The present invention relates to the field of curable and cured perfluoroelastomer (FFKM) compositions and components made therefrom such as sealing materials, which compositions are suitable for various high temperature end applications, particularly for use in the semiconductor area in chemical vapor deposition (CVD) and other semiconductor processing technologies. The present invention provides curable fluorine-containing elastomeric compositions, cured fluorine-containing elastomeric compositions and related molded articles formed from such compositions which are clean compounds and have excellent thermal properties.

2. Description of Related Art

Fluorine-containing elastomers, particularly perfluoroelastomers (FFKM) that include tetrafluoroethylene (TFE) and other fluorinated monomer units exhibit excellent chemical resistance, solvent resistance and heat resistance, and therefore are widely used for a sealing and other materials which are intended for use in harsh environments. As technology advances, the characteristics required even for such highly resistant compounds continue to be more rigorous. In the fields of aeronautics, aerospace, semiconductor and chemical and pharmaceutical manufacturing, sealing properties under harsh chemical environments that are also subject to high temperature environments of not less than 300° C. are encountered, and the ability of such materials to withstand high temperature environments has become increasingly important.

Perfluoroelastomeric materials are also known for their chemical and plasma resistance. However, when used in compositions requiring acceptable compression set resistance and mechanical properties generally include filler or reinforcing systems. It is the goal to use such good high temperature and environmentally resistant materials to form molded parts that are capable of withstanding deformation and that hold up in such rigorous conditions. FFKM materials are typically prepared from perfluorinated monomers, including at least one perfluorinated cure site monomer. The monomers are polymerized to form a curable perfluorinated polymer having the cure sites thereon intended for cross-linking upon reaction with a curative or curing agent. Upon curing (cross-linking), the materials form an elastomeric material. Typical FFKM compositions include a polymerized perfluoropolymer as noted above, a curing agent that will react with the reactive cure site group on the cure site monomer, and any desired fillers. The resulting cured perfluoroelastomeric material exhibits elastomeric characteristics.

FFKMs are also generally known for use as O-rings and in related sealing parts for high-end sealing applications due to their high degree of purity, heat-resistance, and resistance to plasma, chemicals and other harsh environments. There continues to be development of new perfluoroelastomeric compositions due to ever-increasing demands and challenges to be met by FFKMs and compositions based on FFKMs to provide ever higher levels of thermal, chemical and plasma resistance. Industry demands, particularly in the semiconductor area, continue to require enhanced performance of such seals to meet new end-use applications that have increasingly aggressive environments as well as lower and lower contamination and particulation requirements. Thus, there is always the need for better properties but from "clean" compounds, i.e., those that introduce little or no harmful contaminants into the end use environment.

As is recognized in the art, different FFKM compositions may include different curatives (also known as curing agents) depending on the type of cure site monomer (CSM) structure being used and the corresponding curing chemistry applied to react the functional active cure sites on the cure site monomers with the curatives. Such compositions may also include a variety of fillers and combinations of fillers to achieve target mechanical properties, compression set or improved chemical and plasma resistance.

For semiconductor sealing applications, both inorganic and organic fillers have been used to improve plasma resistance depending on the type of plasma chemistry. Typical fillers known in the semiconductor and other industries include carbon black, silica, alumina, TFE-based fluoroplastics, barium sulfate and other polymers and plastics. Fillers used in some FFKM compositions for semiconductor applications include fluoroplastic filler particles formed of polytetrafluoroethylene (PTFE) or melt-processible perfluorinated copolymers such as copolymers of tetrafluoroethylene (TFE) and hexafluoropropylene (HFP) (also referred to as FEP-type copolymers) or of TFE and perfluoroalkylvinyl ethers (PAVEs) (known as PFA-type copolymers), particularly in micro- or nanomer-sized particles.

Such FFKM compositions can include only a single FFKM curable polymer, or sometimes blends of one or more FFKM curable polymers. Similarly there are FFKMs that have only a single cure site on a cure site monomer in the curable perfluoropolymer used in the composition, and FFKMs that have more than one cure site monomer having the same or different cure sites. As demands for cleaner and more chemically resistant compounds increases, the need to achieve properties in FFKMs with little or no filler becomes more of a pressing need. Thus, there are many potential combinations of materials that may be used, and the challenge is achieving higher thermal, chemical and plasma resistant property requirements for various end applications without sacrificing mechanical and sealing properties.

FFKM compositions including semicrystalline fluoroplastic particle fillers, such as microparticles or nanoparticles of PTFE or copolymers such as those of the PFA-type, provide good physical properties, plasma resistance and excellent purity. For semiconductor applications, such systems also help to avoid metallic particulation and contamination at a level improved over FFKMs, which have inorganic fillers such as metal oxides. However, there is a need in the art to develop more simplified processing methods to form fluoropolymer-filled FFKMs. There are various blending processes which have been developed to incorporate TFE-based fluoroplastics into FFKMs to achieve clean compounds. Latex blending has been used but can be expensive for large-scale, commercial batches. Melt blending is also available and generally requires temperatures of up to 350° C. Further, filler loading in many commercial products is generally limited to up to about 30 weight percent of the weight of the base polymeric materials. Use of fluoropolymeric fillers in such compositions can also sometimes contribute to relatively high compression set particularly in end applications at higher temperatures (e.g., >300° C.). Moldability and bondability can also be limited due to use of such fluoropolymeric fillers.

Examples of compounds using such fillers include U.S. Pat. No. 6,710,132 discloses a blend of an FFKM having semi-crystalline fluoroplastic particles (such as PTFE), wherein the particles have a core-shell structure and are formed by latex blending of these materials.

U.S. Pat. No. 4,713,418 discloses a composition formed by melt blending an FFKM and a melt-processible thermoplastic fluoropolymer. The patent asserts that particles of about 10 microns are reformed from some of the melted thermoplastic upon recrystallization. Melt blending is also used in U.S. Pat. No. 7,476,711 to form cured articles from compositions having a blend of FFKM and semi-crystalline thermoplastic copolymer of TFE-PAVE (PFA melt-processible copolymer) present in particles of greater than 100 nm.

Additional fluoroplastic/FFKM blends are disclosed in U.S. Pat. No. 7,019,083 which includes latex particles of a fluoroplastic including a nitrogen-containing cure site which may be combined with an uncured perfluoropolymer (FFKM gum). The latex particles may be of a core-shell structure in which the nitrogen-containing cure sites are provided on the shell of the core-shell particles.

U.S. Pat. No. 7,354,974, noted above, discloses melt blending an FFKM and a semicrystalline polymer such as PTFE and/or a copolymer, such as the PFA-type copolymer, of greater than an average size of 100 nm wherein blending temperature or curing temperature exceeds the melting temperature of the fluoroplastic fillers.

Various polymers have also been developed with unique cure systems to provide base FFKM compounds that have improved heat characteristics. For example, U.S. Pat. No. 6,855,774 teaches use of a curing agent which has at least two crosslinkable functional groups represented by the formula:

(Ia)

The curative is proposed for use with FFKM materials having a cure site that is a nitrile group, carboxyl group or alkoxycarbonyl group. The cross-links formed are described as contributing to increased heat resistance. U.S. Pat. No. 6,878,778 further teaches curatives having at least two groups having the formula:

(Ib)

wherein $R^1$ in each of the groups may be a fluorine atom or a monovalent organic group. Resulting polymers formed using the curatives are described as having excellent chemical resistance and mechanical strength as well as heat resistance at high temperatures.

Blended FFKMs have also been developed to achieve unique properties. FFKMs such as those formed from U.S. Pat. Nos. 6,855,774 and 6,878,778 and other FFKMs as well have been blended as described in U.S. Patent Publication No. 2008/0287627 A1. That publication describes compositions with such polymers as well as with one or more additional FFKM, wherein two of the FFKM compounds in the composition differ in terms of their perfluoroalkyl vinyl ether (PAVE) monomer content by about 5 to about 25 mole percent. Such blends provide the ability to form compositions which can function well without the use of fluoroplastic fillers and are alternatives to and in some cases improvements over such filled materials. Such blends also do not require high temperature mixing, as is required in melt blended compositions, and provide crack-resistance in the presence of harsh chemicals, and good thermal and plasma resistant properties.

Thus, while various blends, unique cure systems and fillers have been proposed as noted above to improve FFKMs by forming clean, or unfilled compounds and/or by blending FFKMs with varied PAVE content as described in the patents and publications noted above, there continues to be a need in the art for further improvements to perfluoroelastomer compositions which, upon cure, retain good and lower compression set values, good plasma resistance, and good physical properties such as relatively low hardness, and sufficient strength and elongation, and which can also continue to meet the increasingly demanding requirements for use in high-end sealing applications like those of semiconductor processing, particularly where high temperature environments are encountered.

BRIEF SUMMARY OF THE INVENTION

Included in the invention herein is a curable fluorine-containing elastomer composition comprising a first curable perfluoropolymer comprising tetrafluoroethylene, a first perfluoroalkylvinyl ether and at least one first cure site monomer having at least one cure site, wherein tetrafluoroethylene is present in the first curable perfluoropolymer in an amount of at least about 50 mole percent; a second curable perfluoropolymer comprising tetrafluoroethylene, a second perfluoroalkylvinyl ether and at least one second cure site monomer having at least one cure site, wherein the second curable perfluoropolymer comprises fluoroplastic particles therein; and at least one curative. Preferably, the first curable perfluoropolymer comprises at least about 60 mole percent tetrafluoroethylene, more preferably at least about 70 mole percent tetrafluoroethylene. In addition, the first perfluoropolymer may comprise about 60 to about 95 mole percent tetrafluoroethylene.

Such compositions are preferably blends having the first curable perfluoropolymer and the second curable perfluoropolymer in a ratio of about 25 to about 75 mole percent to about 75 to about 25 mole percent, preferably about 40 to about 60 mole percent to about 60 to about 40 mole percent, and most preferably about 50 to about 50.

Each of the at least one cure site monomers is preferably present in an amount of about 0.01 to about 10 mole percent respectively in each of the first curable perfluoropolymer and the second curable perfluoropolymer. The at least one curative is preferably present in an amount of about 0.01 to about 5 parts by weight per 100 parts by weight of the perfluoropolymers in the composition, and more preferably about 0.01 to about 2 parts by weight per 100 parts by weight of the perfluoropolymers in the composition.

The at least one cure site in the at least one cure site monomer in the first curable perfluoropolymer is preferably a nitrogen-containing cure site. The at least one cure site in the at least one cure site monomer in the first curable perfluoropolymer may be selected from the group consisting of cyano, carboxyl, carbonyl, alkoxycarbonyl, and combinations thereof.

The fluoroplastic particles are preferably present in the second curable fluoropolymer as a result of either melt-blending or blending during latex polymerization, and most preferably as a result of blending during latex polymerization. It is further preferred that the fluoroplastic particles comprise a nitrogen-containing cure site monomer, wherein the second curable fluoropolymer comprises a cure site monomer having a cure site selected from the group consisting of halogen, nitrogen-containing groups, carboxyl, alkoxycarbonyl and combinations thereof, which cure site monomer may be included in a shell of a core-shell structure for certain forms of fluoropolymeric particles.

The at least one curative may be selected from the group consisting of fluorinated imidoylamidines; bisaminophenols; bisamidines; bisamidoximes; bisamidrazones; monoamidines; monoamidoximes; monoamidrazones; biasminothiophenols; bisdiaminophenyls; aromatic amines having at least two crosslinkable groups represented by the formula (II):

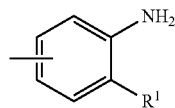
(II)

wherein $R^1$ are the same or different and each is —$NH_2$, —$NHR^2$, —OH or —SH; $R^2$ is a monovalent organic group;

compounds represented by the formula (III):

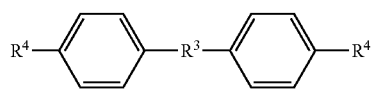
(III)

wherein $R^3$ is —$SO_2$—, —O—, —CO—, an alkylene group having 1 to 6 carbon atoms, a perfluoroalkylene group having 1 to 10 carbon atoms or a single bond and $R^4$ is

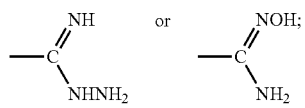

compounds represented by Formula (IV):

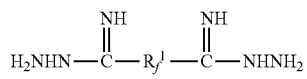
(IV)

wherein $R_f^1$ is a perfluoroalkylene group having 1 to 10 carbon atoms; compounds represented by the formula (V):

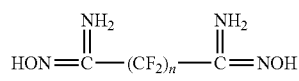
(V)

in which n is an integer of 1 to 10; and combinations thereof, wherein the at least curative is capable of reacting with the least one cure site in the at least one first perfluoropolymer and the at least one cure site in the second perfluoropolymer to crosslink the at least one perfluoropolymer and the at least one second perfluoropolymer in the composition.

The at least one curative is more preferably selected from the group consisting of aromatic amines having at least two crosslinkable groups represented by the formula (II), wherein $R^1$ is —$NHR^2$; fluorinated imidoylamidines; bisaminophenols; and combinations thereof.

In one embodiment, the curable fluorine-containing elastomer composition includes the at least one curative as a compound which is selected from the group consisting of:

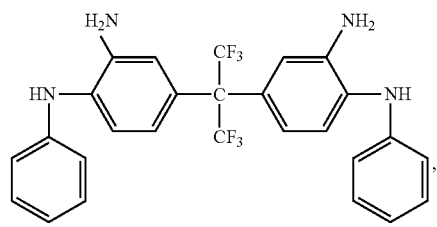
(XI)

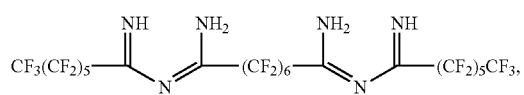
(XII)

bisaminophenol, bisaminophenol AF, and combinations thereof.

In yet a further embodiment, in the composition herein as noted above, the elastomer composition is a perfluoroelastomer composition and the at least one curative comprises

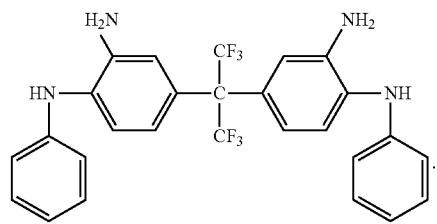
(XI)

In such an embodiment, the at least one curative may further comprise bisaminophenol or bisaminophenol AF. In addition or as an alternative thereto, the at least one curative may further comprise

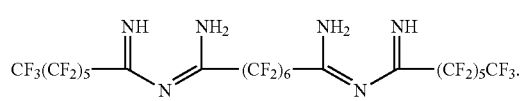
(XII)

In another embodiment of the curable fluorine containing elastomer composition herein, the elastomer composition is a perfluoroelastomer composition and the at least one curative comprises

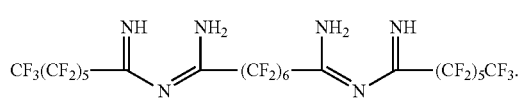
(XII)

It is further preferred that in one embodiment hereof, the cure site monomer in the first curable fluoropolymer and/or the second curable fluoropolymer is $CF_2$=$CFO(CF_2)_5CN$. The invention also includes a curable perfluoroelastomer composition comprising a first curable perfluoropolymer comprising tetrafluoroethylene, a first perfluoroalkylvinyl ether and at least one first cure site monomer having at least one cure site, wherein the tetrafluoroethylene is present in the first curable perfluoropolymer in an amount of at least about 50 mole percent; a second curable perfluoropolymer comprising tetrafluoroethylene, a second perfluoroalkylvinyl ether and at least one second cure site monomer having at least one cure site, wherein the second curable perfluoropolymer comprises fluoroplastic particles therein; and at least one curative the at least one curative is selected from the group consisting of: at least one curative the at least one curative is selected from the group consisting of:

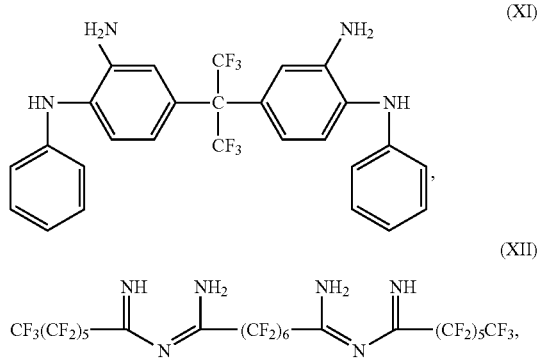

bisaminophenol, bisaminophenol AF, and combinations thereof, wherein at least one of the cure site monomer in the first curable perfluoropolymer and the cure site monomer in the second curable perfluoropolymer is $CF_2$=$CFO(CF_2)_5$ CN, and wherein the second curable fluoropolymer comprises fluoroplastic particles as a result of blending during latex polymerization, the fluoroplastic particles comprising a nitrogen-containing cure site monomer.

In this embodiment, tetrafluoroethylene is preferably present in the first curable perfluoropolymer in an amount of at least about 60 mole percent, and more preferably at least about 70 mole percent. The tetrafluoroethylene may also be present in the first curable perfluoropolymer in an amount of about 60 mole percent to about 95 mole percent.

The invention also includes a cured fluorine-containing elastomer formed by curing a curable fluorine-containing composition comprising a blend of a first curable perfluoropolymer comprising tetrafluoroethylene, a first perfluoroalkylvinyl ether and at least one first cure site monomer having at least one cure site, wherein tetrafluoroethylene is present in the first curable perfluoropolymer in an amount of at least about 50 mole percent; a second curable perfluoropolymer comprising tetrafluoroethylene, a second perfluoroalkylvinyl ether and at least one second cure site monomer having at least one cure site, wherein the second curable perfluoropolymer comprises fluoroplastic particles therein; and at least one curative.

Molded articles are also within the scope of the invention which are formed by heat curing and shaping a composition comprising a blend of a first curable perfluoropolymer comprising tetrafluoroethylene, a first perfluoroalkylvinyl ether and at least one first cure site monomer having at least one cure site, wherein tetrafluoroethylene is present in the first curable perfluoropolymer in an amount of at least about 50 mole percent; a second curable perfluoropolymer comprising tetrafluoroethylene, a second perfluoroalkylvinyl ether and at least one second cure site monomer having at least one cure site, wherein the second curable perfluoropolymer comprises fluoroplastic particles therein; and at least one curative.

DETAILED DESCRIPTION OF THE INVENTION

Compositions are provided herein which have good plasma and chemical resistance and which can be made without additional filler loading, but which also provide required mechanical properties and excellent heat resistance. The combination of properties achieved can be obtained by selectively blending two or more curable perfluoropolymers in a composition with at least one curative as described herein. The resulting materials can be heat-cured and processed into molded articles. The curable fluorine-containing elastomer compositions herein have two or more such curable perfluoropolymers.

It is preferred herein that the two or more perfluoropolymers in the composition are used in and/or cured to form a perfluoroelastomeric blended composition, however, such polymers may be used in combination with other non-perfluorinated curable fluoropolymers forming a fluorinated elastomer having these components therein upon cure.

As used in this application, "perfluoroelastomer" or "cured perfluoroelastomer" unless otherwise indicated, includes any cured elastomeric material or composition that is formed by curing a curable perfluoropolymer(s) such as the curable perfluoropolymers in the curable perfluoroelastomeric compositions described herein.

A "curable perfluoropolymer" (sometimes referred to in the art as a "perfluoroelastomer" or more appropriately a "perfluoroelastomer gum") that may be used to form a cured perfluoroelastomer is a polymer that is substantially completely fluorinated, which is preferably completely perfluorinated on its polymeric backbone. It will be understood, based on this disclosure, that some residual hydrogen may be present in some perfluoroelastomers within the crosslinks of those materials due to use of hydrogen as part of a functional crosslinking group. Cured materials, such as perfluoroelastomers are cross-linked polymeric structures.

The curable perfluoropolymers that are used in the perfluoroelastomeric compositions to form cured perfluoroelastomers upon cure are formed by polymerizing one or more perfluorinated monomers, one of which is preferably a perfluorinated cure site monomer having a "cure site," which is a functional group to permit curing, wherein the functional group includes a reactive group that may not be perfluorinated. Two or more perfluoropolymers, and preferably at least one curative (curing agent), are combined herein in a composition that is then cured forming the resulting crosslinked, cured fluoroelastomeric compositions, and preferably perfluoroelastomeric compositions as described herein.

As used herein, the curable fluorine-containing elastomeric compositions may be "perfluoroelastomeric compositions" which are blended and combined compositions formed from two or more curable perfluoropolymers, each of which is formed by polymerizing two or more perfluorinated monomers, including at least one perfluorinated monomer which has at least one functional group (cure site) to permit curing, i.e. there is at least one cure site monomer. Such curable perfluoropolymer materials are also referred to generally as FFKMs in accordance with the American Standardized Testing Methods (ASTM) standardized rubber definitions and as described further herein.

As used herein, "compression set" refers to the propensity of an elastomeric material to remain distorted and not return to its original shape after a deforming compressive load has been removed. The compression set value is expressed as a percentage of the original deflection that the material fails to recover. For example, a compression set value of 0% indicates that a material completely returns to its original shape after removal of a deforming compressive load. Conversely, a compression set value of 100% indicates that a material does not recover at all from an applied deforming compressive load. A compression set value of 30% signifies that 70% of the original deflection has been recovered. Higher compression set values generally indicate a potential for seal leakage and so compression set values of 30% or less are preferred in the sealing arts.

As described herein, the invention includes curable fluorine-containing compositions, preferably curable perfluoroelastomeric compositions, cured compositions, preferably cured perfluoroelastomer compositions and molded articles formed from the same.

Such perfluoroelastomeric compositions preferably include two or more curably perfluoropolymers, preferably perfluoro-copolymers, at least one of which perfluoropolymers has a high content of tetrafluoroethylene (TFE). Other suitable co-monomers may include other ethylenically unsaturated fluoromonomers. While both polymers preferably have TFE or another similar perfluorinated olefin monomer, at least one is a high-TFE perfluoropolymer. Each polymer also preferably has one or more perfluoroalkylvinyl ethers (PAVEs), which include alkyl or alkoxy groups that may be straight or branched and which may also include ether linkages, wherein preferred PAVEs for use herein include, for example, perfluoromethylvinyl ether (PMVE), perfluoroethylvinyl ether (PEVE), perfluoropropylvinyl ether (PPVE), perfluoromethoxyvinyl ether and other similar compounds, with especially preferred PAVEs being PMVE, PEVE and PPVE, and most preferred being PMVE which provides excellent mechanical strength to resulting articles formed from curing the curable compositions herein. The PAVEs may be used alone or in combinations of the above-noted PAVE types within the curable perfluoropolymers and in the ultimate curable compositions so long as the use is consistent with the invention as described herein.

Preferred perfluoropolymers are co-polymers of TFE, at least one PAVE, and at least one perfluorinated cure site monomer that incorporates a cure site or functional group to permit crosslinking of the curable polymer. The cure site monomers may be of a variety of types with preferred cure sites noted herein. Preferred cure sites preferably are those having a nitrogen-containing group, however, other cure site groups such as carboxyl groups, alkylcarbonyl groups, or halogenated groups having, e.g., iodine or bromine as well as other cure sites known in the art may also be used, particularly since additional curable perfluoropolymers beyond the first and second curable perfluoropolymers may be provided to the composition. Consequently, while the disclosure herein provides a variety of preferred curatives (also referred to herein as crosslinking agents, curing agents), if other cure sites known in the art are used, other curatives that are capable of curing such alternative cure sites may also be used. For example, organic peroxide-based curatives and co-curatives may be used with halogenated functional cure site groups. It is most preferred that both the first and the second perfluoropolymers include nitrogen-containing cure sites.

Exemplary cure site monomers are listed below, most of which are PAVE-based in structure and have a reactive site. Although the polymers may vary, preferred structures are those having the following structure (A):

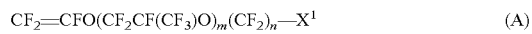

wherein m is 0 or an integer from 1 to 5, n is an integer from 1 to 5 and $X^1$ is a nitrogen-containing group, such as nitrile or cyano. However, carboxyl groups, alkoxycarbonyl groups or halogenated end groups may also be used as $X^1$. Most preferably the cure site monomer in either or both of the first and the second curable perfluoropolymers in the compositions herein is in accordance with (A) noted above, wherein m is 0 and n is 5. The cure sites or functional groups $X^1$ noted herein, e.g., nitrogen-containing groups, include the reactive sites for crosslinking when reacted with a curative. Compounds according to formula (A) may be used alone or in various, optional, combinations thereof. From a crosslinking perspective, it is preferred that the crosslinking functional group is a nitrogen-containing group, preferably a nitrile group.

Further examples of cure site monomers according to formula (A) include formulas (1) through (17) below:

wherein Y is H or F, n is an integer from 1 to about 8

wherein $R_f^2$ is $(-CF_2)_n-$, $-(OCF_2)_n-$ and n is 0 or an integer from 1 to about 5

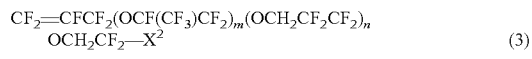

wherein m is 0 or an integer from 1 to about 5 and n is 0 or an integer of from 1 to about 5

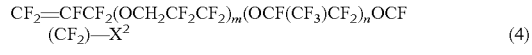

wherein m is 0 or an integer from 1 to about 5, and n is 0 or an integer of from 1 to about 5

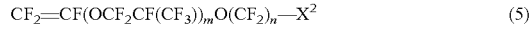

wherein m is 0 or an integer from 1 to about 5, and n is an integer of from 1 to about 8

wherein m is an integer from 1 to about 5

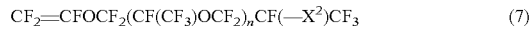

wherein n is an integer from 1 to about 4

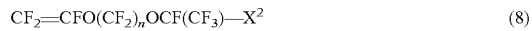

wherein n is an integer of from 2 to about 5

wherein n is an integer from 1 to about 6

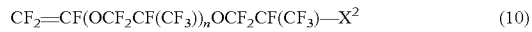

wherein n is an integer from 1 to about 2

$$CH_2=CFCF_2O(CF(CF_3)CF_2O)_nCF(CF_3)-X^2 \quad (11)$$

wherein n is 0 or an integer from 1 to about 5

$$CF_2=CFO(CF_2CF(CF_3)O)_m(CF_2)_n-X^2 \quad (12)$$

wherein m is 0 or an integer from 1 to about 4 and n is an integer of 1 to about 5

$$CH_2=CFCF_2OCF(CF_3)OCF(CF_3)-X^2 \quad (13)$$

$$CH_2=CFCF_2OCH_2CF_2-X^2 \quad (14)$$

$$CF_2=CFO(CF_2CF(CF_3)O)_mCF_2CF(CF_3)-X^2 \quad (15)$$

wherein m is an integer greater than 0

$$CF_2=CFOCF(CF_3)CF_2O(CF_2)_n-X^2 \quad (16)$$

wherein n is an integer that is at least 1

$$CF_2=CFOCF_2OCF_2CF(CF_3))OCF_2-X^2 \quad (17)$$

wherein $X^2$ can be a monomer reactive site subunit such as a nitrile (—CN), carboxyl (—COOH), an alkoxycarbonyl group (—COOR$^5$, wherein R$^5$ is an alkyl group of 1 to about 10 carbon atoms which may be fluorinated or perfluorinated), a halogen or alkylated halogen group (I or Br, CH$_2$I and the like). It is preferred that perfluorinated compounds having no hydrogen atoms in that portion of the backbone of the cure site monomer that will lie in the polymer backbone chain are used if excellent heat resistance is desired for the perfluoroelastomer resulting from curing the perfluoropolymers as well as for preventing decrease in molecular weight due to chain transfer when synthesizing the perfluoroelastomer by polymerization reaction. Further, compounds having a $CF_2=CFO-$ structure are preferred from the viewpoint of providing excellent polymerization reactivity with TFE.

Suitable cure site monomers preferably include those having nitrogen-containing cure sites such as nitrile or cyano cure sites, for preferred crosslinking reactivity. However, cure sites (having multiple and varied backbones in addition to those noted above) and having carboxyl, alkoxycarbonyls, COOH and other similar cure sites known in the art and to be developed may also be used. The cure site monomers may be used alone or in varied combinations.

The preferred high-TFE perfluoropolymer used herein, preferably has a molar percentage of TFE in the perfluoropolymer compound that is at least about 50 mole percent, more preferably about 60 mole percent, most preferably about 70 mole percent or more. Use of about 60 mole percent to about 95 mole percent is acceptable herein for a variety of useful high-TFE perfluoropolymers. A most preferred monomer content is TFE/PAVE/Cure site monomer which is 69.4:30.2:0.43, although the precise monomer content may vary for different uses and effects. A variety of PAVEs may be used in the high-TFE, and the cure site monomer is preferably $CF_2=CFO(CF_2)_5CN$. Suitable such perfluoropolymers are commercially available from Daikin Industries, Ltd. and are described in U.S. Pat. Nos. 6,518,366, 6,878,778 and U.S. Published Patent Application No. 2008-0287627, which are each incorporated herein in relevant part with respect to the high-TFE perfluoropolymers described therein.

The second perfluoropolymer used herein may be the same or different than that noted above for use as the high-TFE first perfluoropolymer, but need not have a high content of TFE. Preferably the second perfluoropolymer is one in which fluoroplastic material has been blended into the polymer and exists within the polymer in particulate form, which particulate form is preferably a micro- or nano-particulate form, however, particle size may vary depending on the manufacturing process used. The particles may be provided in a variety of forms and using a variety of techniques. Fluoroplastics such as PTFE, and melt-processible co-polymers thereof (FEP and PFA type polymers), core-shell polymers in a variety of sizes (microparticles, nanoparticles and the like) may be incorporated into the material by mechanical means or chemical processing and/or polymerization. Preferably, the fluoroparticles are micro- or nano-particle sized and/or are incorporated into the second perfluoropolymer using melt blending or latex polymerization techniques. Melt blending techniques may be employed, such as those described in U.S. Pat. Nos. 4,713,418 and 7,476,711 (each of which is incorporated herein by reference with respect to such melt-process technology). Latex polymerization techniques are also useful and are most preferred for incorporating fluoroplastics into the second perfluoropolymer herein. A suitable process and resulting perfluoropolymer incorporating core-shell and other particles having cure sites incorporated into the particles as well is described in U.S. Pat. No. 7,019,083, also incorporated herein by reference with respect to such perfluoropolymers having fluoroplastic particles and methods for making the same and may have the monomer contents and combinations of materials described therein. Suitable such polymers are commercially available from 3M Corporation of St. Paul, Minn.

Examples of perfluoropolymers and resulting elastomers formed therefrom using cure site monomers such as those noted above may be also be found in WO 00/29479 A1, incorporated herein in relevant part with respect to such perfluoroelastomers, their content and methods of making the same. Reference is also made to U.S. Pat. Nos. 6,518,366, 6,878,778 and U.S. Published Patent Application No. 2008-0287627 as well as U.S. Pat. No. 7,019,083.

Perfluoropolymers for use in the compositions claimed herein may be synthesized using any known or to be developed polymerization technique for forming fluorine-containing elastomers using polymerization, including, for example, emulsion polymerization, latex polymerization, chain initiated polymerization, batch polymerization and others. Preferably, the polymerization is undertaken so that reactive cure sites are located either on either or both terminal ends of the polymer backbone and/or are depending from the main polymer backbone.

One possible method of making the polymers includes radical polymerization using an initiator such as those known in the art for polymerization of fluorine-containing elastomers (organic or inorganic peroxide and azo compounds). Typical initiators are persulfates, percarbonates, peresters and the like, with preferred initiators being include salts of persulfuric acid, oxidizing carbonates and esters, and ammonium persulfate, with the most preferred being ammonium persulfate (APS). These initiators may be used alone or with reducing agents, such as sulfites and sulfite salts.

A wide variety of emulsifiers for emulsion polymerization can be used, but preferred are salts of carboxylic acid having a fluorocarbon chain or a fluoropolyether chain, to suppress chain transfer reactions to the emulsifier molecules that occur during polymerization. The amount of emulsifier is generally used in amounts of about 0.05 to 2 weight percent, and preferably 0.2 to 1.5 weight percent, based on the added water. It is noted that a special arrangements should be used to avoid an ignition source, such as sparks, near the polymerization equipment. See, G. H. Kalb, Advanced Chemistry Series, 129, 12 (1973).

Polymerization pressure may vary, and can generally be in the range 0.5 to 7 MPa. The higher the polymerization pressure is, the higher the polymerization rate will be. Accordingly if productivity enhancement is desired, the polymerization pressure is preferably at least 0.7 MPa. Latex polymerization techniques are also described in U.S. Pat. No. 7,019,083, which is also incorporated herein by reference for manufacturing techniques described therein.

Standard polymerization procedures known in the art may be used. If a nitrogen-containing group, such as nitrile or cyano, a carboxyl group, or an alkoxycarbonyl group is to be used in the curable perfluoropolymers herein, it may be included in the polymer by copolymerizing an additional monomer having the crosslinking site containing that group. The cure-site monomer may be added and copolymerized when preparing the fluorine-containing elastomer. A further method for providing such a group to the polymer is by subjecting a polymerization product to an acid treatment to convert a group such as a metallic salt or ammonium salt of a carboxylic acid contained in the polymerization product to a carboxyl group. Examples of a suitable acid treatment method are washing with hydrochloric acid, sulfuric acid, nitric acid or fuming sulfuric acid or by decreasing a pH value of a mixture system after the polymerization reaction to 3 or less by using the above-mentioned acids. Another method for introducing a carboxyl group is by oxidizing a crosslinkable polymer having iodine and bromine, with fuming nitric acid.

Uncured perfluoropolymers are commercially available, including perfluoropolymers sold under the name Dyneon™ by 3M Corporation, St. Paul, Minn., Daiel-Perfluor® and other similar polymers, available from Daikin Industries, Ltd. of Osaka, Japan. Other suitable materials are available also from Solvay Solexis in Italy, Federal State Unitary Enterprise S.V. Lebedev Institute of Synthetic Rubber of Petersburg, Russia, Asahi Glass, Japan, and W.L. Gore.

Curatives (also referred to herein as crosslinking agents or curing agents) for use with various curable fluorine-containing compositions and elastomer-containing compositions of the present invention are for use with various cure sites described herein and should be capable of curing (i.e., capable of crosslinking) or otherwise undergoing a curing reaction with the cure sites or functional groups of the cure site monomer(s) or cure site in the various uncured perfluoropolymers in the compositions to form crosslinks. Preferred crosslinking or curing agents are those that form crosslinks that have oxazole, thiazole, imidazole, or a triazine rings. Such compounds as well as other curatives including amidoximes, tetraamines and amidrazones may be used for crosslinking in the present invention. Of these, imidazoles are preferred in that crosslinked article providing excellent mechanical strength, heat resistance, chemical resistance, cold resistance is achievable, particularly a cured article which is balanced and excellent with respect to heat resistance and cold resistance.

For nitrogen-containing cure sites, other curatives such as bisphenyl-based curatives and derivatives thereof, including bisaminophenol and its salts (such as bisaminophenol AF), bisaminothiphenols, parabenzoquinone dioxime (PBQD) and tetraphenyltin may be used. Examples of suitable curatives may be found, for example, in U.S. Pat. Nos. 7,521,510 B2, 7,247,749 B2 and 7,514,506 B2, each of which is incorporated herein in relevant part with respect to the listing of various curatives for cyano-group containing perfluoropolymers. In addition, the perfluoropolymers may be cured using radiation-curing technology.

Most preferred are cyano-group containing cure sites cured with curatives that are aromatic amines having at least two crosslinkable groups as in formulas (I) and (II) below, or a combination thereof, which form benzoimidazole cross-linking structures upon cure. These curatives are known in the art and discussed in relevant part and with specific examples in U.S. Pat. Nos. 6,878,778 and U.S. Pat. No. 6,855,774, which are incorporated herein in their entirety.

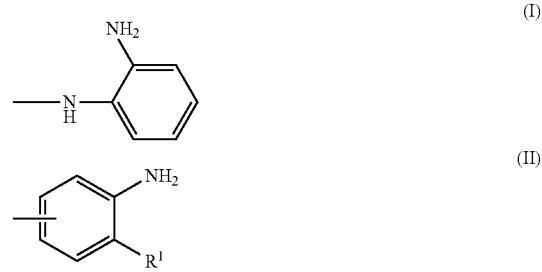

wherein $R^1$ is the same or different in each group according to formula (II) and may be $NH_2$, $NHR^2$, OH, SH or a monovalent organic group or other organic group such as alkyl, alkoxy, aryl, aryloxy, aralkyl and aralkyloxy of from about 1 to about 10 carbon atoms, wherein the non-aryl type groups may be branched or straight chain and substituted or unsubstituted and $R^2$ may be —$NH_2$, —OH, —SH or a monovalent or other organic group such as an aliphatic hydrocarbon group, a phenyl group and a benzyl group, or alkyl, alkoxy, aryl, aryloxy, aralkyl and aralkyloxy groups, wherein each group is from about 1 to about 10 carbon atoms, wherein the non-aryl type groups may be branched or straight chain and substituted or unsubstituted. Preferred monovalent or other organic groups, such as alkyl and alkoxy (or perfluorinated versions thereof) are from 1 to 6 carbon atoms, and preferred aryl type groups are phenyl and benzyl groups. Examples thereof include —$CF_3$, —$C_2F_5$, —$CH_2F$, —$CH_2CF_3$ or —$CH_2C_2F_5$, a phenyl group, a benzyl group; or a phenyl or benzyl group wherein 1 to about 5 of the hydrogen atoms are substituted by fluorine atoms such as —$C_6F_5$, —$CH_2C_6CF_5$, wherein groups may be further substituted, including with —$CF_3$ or other lower perfluoroalkyl groups, or, phenyl or benzyl groups in which 1 to 5 hydrogen atoms are substituted by $CF_3$ such as for example $C_6H_{5-n}(CF_3)_n$, —$CH_2C_6H_{5-n}(CF_3)_n$ (wherein n is from 1 to about 5). Hydrogen atoms may be further substituted with phenyl or benzyl groups. However, a phenyl group and $CH_3$ are preferred as providing superior heat resistance, good cross-linking reactivity and relatively easy synthesis.

A structure having formula (I) or (II) incorporated in an organic amine should include at least two such groups of formula (I) or (II) such that at least two cross-linking reactive groups are provided.

Also useful herein are curatives having formulas (III), (IV) and (V) shown below.

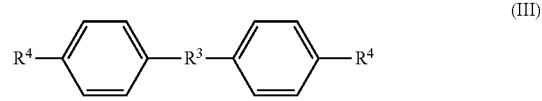

wherein $R^3$ is preferably SO, O or CO or an organic or alkylene type group, such as an alkyl, alkoxy, aryl, aralkyl or aralkoxy group of from one to six carbon atoms or perfluorinated versions of such groups, having from about one to about 10 carbon atoms, and being branched or straight chain, saturated or unsaturated, and branched or straight chain (with respect to the non-aryl type groups) or a single bond. $R^4$ is preferably a reactive side group such as those set forth below:

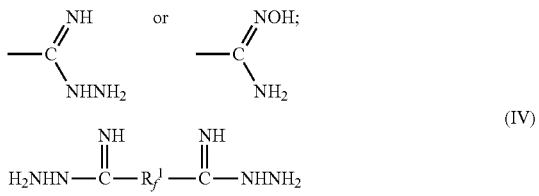

(IV)

wherein $R_f^1$ is a perfluoroalkyl or perfluoroalkoxy group of from about 1 to about 10 carbon atoms that may be a straight or branched chain group and/or saturated or unsaturated and/or substituted or unsubstituted; and (V)

$$HON=\overset{NH_2}{\underset{}{C}}-(CF_2)_n-\overset{NH_2}{\underset{}{C}}=NOH$$

wherein n is an integer of about 1 to about 10.

Combinations of all of the curatives herein are within the scope of the invention. With respect to heat resistance, oxazole-, imidazole-, thiazole- and triazine-ring forming crosslinking agents are preferred and can include the formula compounds listed below and discussed further below with respect to Formulae (I), (II), (III), (IV) and (V), specifically, formula (II) wherein $R^1$ is the same or different and each is $-NH_2$, $-NHR^2$, $-OH$ or $-SH$, wherein $R^2$ is a monovalent organic group, preferably not hydrogen; formula (III) wherein $R^3$ is $-SO_2-$, $-O-$, $-CO-$, and alkylene group of 1 to about 6 carbon atoms, a perfluoroalkylene group of 1 to about 10 carbon atoms or a single bond and $R^4$ is as noted below; formula (IV) wherein $R_f^1$ is a perfluoroalkylene group of 1 to about 10 carbon atoms, and formula (V) wherein n is an integer of 1 to about 10. Of such compounds, those of formula (II) as noted herein are preferred for heat resistance, which is enhanced due to stabilization of the aromatic rings after crosslinking. With respect to $R^1$ in the formula (II), it is preferred also to use $-NHR^2$ as $R^1$, since an $N-R^2$ bond (wherein $R^2$ is a monovalent organic group and not hydrogen) is higher in oxidation resistance than an N—H bond, Compounds having at least two groups as in formula (II) are preferred and having 2 to 3 crosslinkable reactive groups thereon, more preferably having 2 crosslinkable groups.

Exemplary curatives based on the above preferred formulae include at least two functional groups, such as the following structures formula (VI), (VII) or (VIII):

(VI)

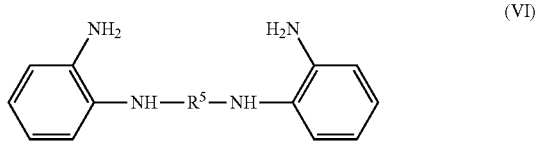

wherein $R^5$ represents a saturated or unsaturated, branched or straight chain, substituted or unsubstituted group such as alkyl, alkoxy, aryl, SO, O, CO, or similar groups which are perfluorinated with respect to the carbon atoms and which is preferably about 1 to about 10 carbon atoms;

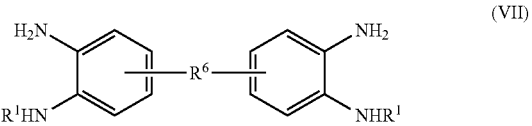

(VII)

wherein $R^1$ is as defined elsewhere herein and $R^6$ may be O, $SO_2$, CO or an organic group which may be perfluorinated, such as alkyl, alkoxy, aryl, aryloxy, aralkyl and aralkyloxy of from about 1 to about 10 carbon atoms, wherein the non-aryl type groups may be branched or straight chain and substituted or unsubstituted, or a single or alkylene bond.

From the view of easy synthesis, preferred crosslinking agents are compounds having two crosslinkable reactive groups as represented by formula (II) are shown below in formula (VIII).

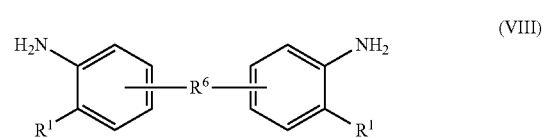

(VIII)

wherein $R^1$ is as above and $R^6$ is $-SO_2-$, $-O-$, $-CO-$, an alkylene group of 1 to about 6 carbon atoms, a perfluoroalkylene group of 1 to about 10 carbon atoms, a single bond or a group as shown in Formula (IX):

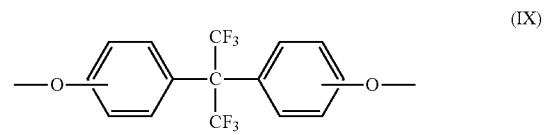

(IX)

wherein this formula provides an easier the synthesis. Preferred examples of alkylene groups of from 1 to about 6 carbon atoms are methylene, ethylene, propylene, butylene, pentylene, hexylene and the like. Examples of perfluoroalkylene groups of 1 to about 10 carbon atoms are

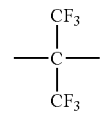

and the like. These compounds are known as examples of bisaminophenyl compounds. Preferred compounds according to this structure include those of formula (X):

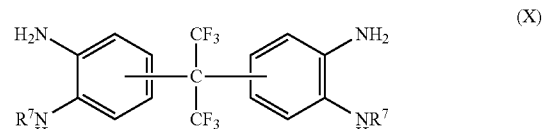

(X)

wherein $R^7$ is the same or different in each instance and each $R^7$ is hydrogen, an alkyl group of 1 to about 10 carbon atoms; a partially fluorinated or perfluorinated alkyl group of 1 to 10 carbon atoms; a phenyl group; a benzyl group; or a phenyl or benzyl group in which 1 to about 5 hydrogen atoms have been replaced by fluorine or a lower alkyl or perfluoroalkyl group such as $CF_3$.

Non-limited examples of curatives include 2,2-bis(2,4-diaminophenylhexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-phenylamino)phenyl]hexafluoropropane, 2,2-bis[3-amino-4-(N-perfluorophenylamino)phenyl] hexafluoropropane, 2,2-bis[3-amino-4(N-benzylamino) phenyl]hexafluoropropane, and similar compounds. Of these, for preferred excellent heat resistance properties, 2,2-bis[3-amino-4(N-methylamino)phenyl]hexafluoropropane, 2,2-bis [3-amino-4-(N-ethylamino)phenyl]hexafluoropropane, 2,2-bis[3-amino-4-(N-propylamino)phenyl]hexafluoropropane and 2,2-bis[3-amino-4-(N-phenylamino)phenyl]hexafluoropropane are preferred. Also preferred for heat resistant properties is tetra-amines such as 4,4'-[2,2,2-Trifluoro-1-(trifluoromethyl)ethylidene]bis[N1-phenyl-1,2-benzenediamine] or 2,2-bis[3-amino-4-(N-phenylaminophenyl)]hexafluoropropane is preferred.

Other suitable curatives include oxazole-, imidazole-, thiazole-, and triazine-ring forming curatives, amidoxime and amidrazone crosslinking agents, and particularly bisaminophenols, bisaminothiophenols, bisamidines, bisamidoximes, bisamidrazones, monoamidines, monoamidoximes and monoamidrazones as known in the art or to be developed, examples of which are set forth, for example in U.S. Pat. Nos. 7,247,749 and 7,521,510, incorporated herein in relevant part by reference, including the curatives and co-curatives and accelerators therein. Imidazoles are useful in that they can contribute to good mechanical strength, heat resistance, chemical resistance, and low temperature capacity, as well as a good balance of crosslinking properties and high and low temperature properties. The bisamidoxime, bisamidrazone, bisaminophenol, bisaminothiophenol or bisdiaminophenyl curatives can react with nitrile or cyano groups, carboxyl groups, and/or alkoxycarbonyl groups in the perfluoropolymer to form a perfluoroelastomer preferred in some embodiments herein having an oxazole ring, a thiazole ring, an imidazole ring, or a triazine ring as crosslinks in the resulting cured articles formed from the compositions herein.

In one embodiment herein, a compound can be used including at least two chemical groups with cross-linking reactive groups as in Formula (I) or (II) in order to increase heat resistance and to stabilize an aromatic ring system. For groups such as in (I) or (II), having two to three such groups, it is preferred to have at least two in each group (I) or (II), as having a lesser number of groups may not provide adequate cross-linking Such compositions preferably are blends having the first curable perfluoropolymer and the second curable perfluoropolymer in a ratio of about 25 to about 75 mole percent to about 75 to about 25 mole percent, preferably about 40 to about 60 mole percent to about 60 to about 40 mole percent, and most preferably about 50 to about 50.

Each of the at least one cure site monomers in each of the curable perfluoropolymers is preferably present in an amount of about 0.01 to about 10 mole percent respectively and individually in each of the first curable perfluoropolymer and the second curable perfluoropolymer. The at least one curative is preferably present in an amount of about 0.01 to about 5 parts by weight per 100 parts by weight of the perfluoropolymers in the composition, and more preferably about 0.01 to about 2 parts by weight per 100 parts by weight of the perfluoropolymers in the composition.

The at one cure site in the at least one cure site monomer in either or both of the first and second curable perfluoropolymers is preferably a nitrogen-containing cure site. The at least one cure site in the at least one cure site monomer in the first curable perfluoropolymer may be selected from the group consisting of cyano, carboxyl, carbonyl, alkoxycarbonyl, and combinations thereof, and most preferably is a cyano group.

The at least one curative is preferably one of the following suitable curatives: fluorinated imidoylamidines; bisaminophenols; bisamidines; bisamidoximes; bisamidrazones; monoamidines; monoamidoximes; monoamidrazones; biasminothiophenols; bisdiaminophenyls; tetra-amines and aromatic amines having at least two crosslinkable groups represented by the formula (II):

wherein $R^1$ are the same or different and each is $—NH_2$, $—NHR^2$, $—OH$ or $—SH$; $R^2$ is a monovalent organic group; compounds represented by the formula (III):

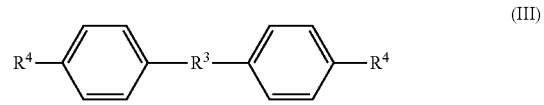

wherein $R^3$ is $—SO_2—$, $—O—$, $—CO—$, an alkylene group having 1 to 6 carbon atoms, a perfluoroalkylene group having 1 to 10 carbon atoms or a single bond and $R^4$ is

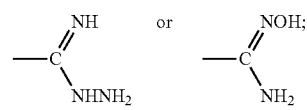

compounds represented by Formula (IV):

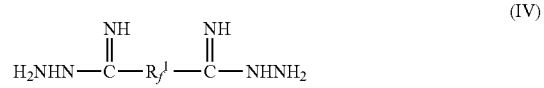

wherein $R_f^1$ is a perfluoroalkylene group having 1 to 10 carbon atoms; compounds represented by the formula (V):

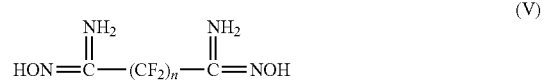

in which n is an integer of 1 to 10; and combinations thereof, wherein the at least curative is capable of reacting with the least one cure site in the at least one first perfluoropolymer and the at least one cure site in the second perfluoropolymer to crosslink the at least one perfluoropolymer and the at least one second perfluoropolymer in the composition.

The at least one curative is even more preferably an aromatic amine having at least two crosslinkable groups represented by the formula (II), wherein $R^1$ is —$NHR^2$; fluorinated imidoylamidines; bisaminophenols; and combinations thereof.

In one embodiment, the curable fluorine-containing elastomer composition includes the at least one curative as a compound which is preferably a tetra-amine compound within the scope of those compounds noted above. Such compounds may be used alone or in combination. Most preferred compounds for use herein as curatives are those in accordance with formula (II) wherein $R^1$ is —$NHR^2$ and $R^2$ is an aryl group. Such compound is also known as is 4,4'-[2,2,2-Trifluoro-1-(trifluoromethyl)ethylidene]bis[N1-phenyl-1,2-benzenediamine] ("Nph-AF").

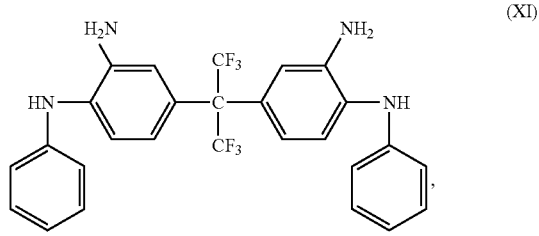 [SMILES: Nc1cc(C(c2ccc(Nc3ccccc3)c(N)c2)(C(F)(F)F)C(F)(F)F)ccc1Nc1ccccc1]

(XI)

Another preferred curative includes perfluoroimidoylamidines such as those found in U.S. Patent Publication No. 2008-0035883 A1, incorporated by reference herein with respect to the following compound and similar compounds. One preferred compound, also described as DPIA-65 is shown hereinbelow.

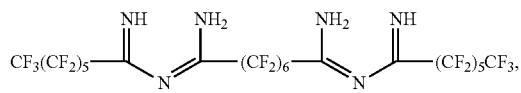

(XII)

Other preferred compounds are bisaminophenol, bisaminophenol AF, and combinations thereof.

In yet further embodiments, the composition is preferably a perfluoroelastomer composition and the at least one curative includes use of Nph-AF

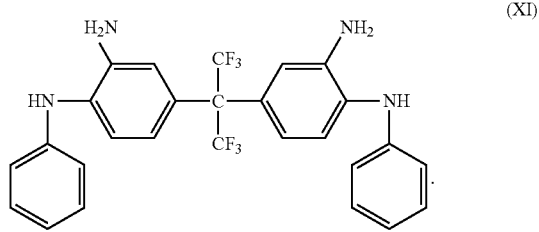 [SMILES: Nc1cc(C(c2ccc(Nc3ccccc3)c(N)c2)(C(F)(F)F)C(F)(F)F)ccc1Nc1ccccc1]

(XI)

This compound may be used alone or with another curative(s), such as in combination with bisaminophenol or bisaminophenol AF and/or in combination with or as an alternative thereto, wherein the at least one curative may further comprise the DPIA-65:

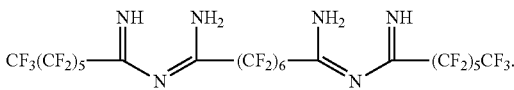

(XII)

The invention also includes a curable perfluoroelastomer composition comprising a first curable perfluoropolymer comprising tetrafluoroethylene, a first perfluoroalkylvinyl ether and at least one first cure site monomer having at least one cure site, wherein the tetrafluoroethylene is present in the first curable perfluoropolymer in an amount of at least about 50 mole percent; a second curable perfluoropolymer comprising tetrafluoroethylene, a second perfluoroalkylvinyl ether and at least one second cure site monomer having at least one cure site, wherein the second curable perfluoropolymer comprises fluoroplastic particles therein; and at least one curative the at least one curative is selected from the group consisting of: at least one curative the at least one curative is selected from the group consisting of:

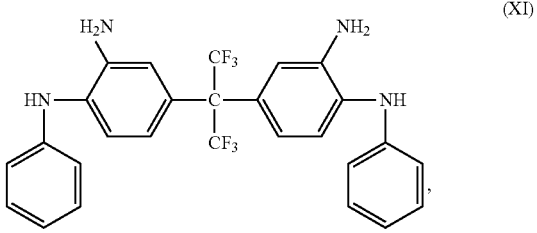

(XI)

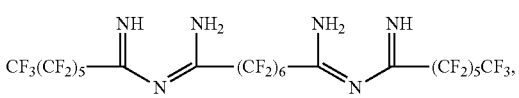

(XII)

bisaminophenol, bisaminophenol AF, and combinations thereof, wherein at least one of the cure site monomer in the first curable perfluoropolymer and the cure site monomer in the second curable perfluoropolymer is $CF_2$=$CFO(CF_2)_5$ CN, and wherein the second curable fluoropolymer comprises fluoroplastic particles as a result of blending during latex polymerization, the fluoroplastic particles comprising a nitrogen-containing cure site monomer.

In addition to the preferred curatives noted herein for use with fluorine-containing curable perfluoropolymers having nitrile groups and the like, it is within the scope of the invention to cure the nitrile groups using curatives known in the art for the first and second perfluoropolymers and/or for other perfluoropolymers added to the compositions herein. Examples of other curatives known in the art include organotins such as tetraphenyltin, triphenyltin and the like (as these compounds form preferred triazine rings). If an organotin compound is used, it is preferred to be present in an amount of about 0.05 to about 10 parts by weight, more preferably about 1 to about 5 parts by weight, based on 100 parts by weight of the curable perfluoropolymers in the composition. If the organotin is present in an amount of less than about 0.05 parts, there is a tendency for the polymer to not sufficiently crosslink upon curing and if the amount is more than about 10 parts, physical properties of the formed articles tend to deteriorate. Peroxide curatives and co-curatives as are well known in the art may also be used if halogenated cure sites are employed.

Such cured perfluoroelastomer compositions formed from curable perfluoroelastomeric compositions as noted herein may be cured and shaped so as to form a molded article(s). Generally, the molded articles will be formed as sealing members such as O-rings, seals, gaskets, inserts and the like, but other shapes and uses known or to be developed in the art are contemplated herein.

The molded article may be bonded to a surface for forming, for example, bonded seals. Such bonded seals may be used, for example for forming pre-bonded doors, gates, and slit valve doors for use, e.g., in semiconductor processing. The surfaces to which such molded articles, such as seals may be bonded include polymeric surfaces as well as metal and metal alloy surfaces. In one embodiment, the invention includes a gate or slit valve door formed of, e.g., stainless steel or aluminum, to which an O-ring seal conforming to a recess in the door configured for receiving the seal. The bonding may occur through use of a bonding composition or through an adhesive. Further, a bonding agent may be prepared which is formed of a fluorosolvent, such as one of several Fluorinert® solvents from 3M capable of dissolving a perfluoropolymer, at least one curable perfluoropolymer and a curative.

The bonding agent may be applied to the O-ring or the recess of the door either after initial curing of an extruded polymer in a mold for making an O-ring and prior to bonding the seal to a surface such as a door, or the bonding agent can be applied to an extruded polymer which can be molded and cured in situ in the surface (door) to which it is to be bonded so that upon heat curing, the perfluoropolymers are cured in the O-ring and also within the bonding agent at the same time. Preferably, although not necessarily, the perfluoropolymer used in the bonding agent is the same as at least one of the perfluoropolymers in the perfluoroelastomer compositions described herein. The bonding agent may also preferably include both perfluoropolymers used in the curable perfluoroelastomeric compositions described herein and/or can be useful using any suitable curable perfluoropolymer capable of curing to bond the compositions to the intended surface.

The curable perfluoroelastomeric composition is first prepared by combining the at least two curable perfluoropolymers as described elsewhere herein as a first and a second perfluoropolymer and at least one curative capable of curing the cure site of the at least one first and second cure site monomers.

The polymers may be combined using typical rubber processing equipment such as an open roll, Banbury mixer, kneader or the like. The compositions may also be prepared using a method of a closed mixer and a method of coagulation through emulsion mixing. Preferably a typical mixer, such as a two-roll mixer as is typically used for combining perfluoropolymers (also referred to as perfluoroelastomer gum). Preferably, in this method, the polymers are mixed at room temperatures, or at elevated temperatures of about 30° C. to about 100° C., and preferably about 50° C.

If desired, and although unnecessary, additives may also be admixed into the composition at this point. Additives are optional and not required due to the unique nature of the interaction of the first and second curable perfluoropolymers and the properties conveyed by the blended composition. However, if desired to alter certain properties, cure accelerators, co-curatives, co-agents, processing aids, plasticizers, fillers and modifiers such as silica, fluoropolymers (TFE and its melt-processible copolymers as well as core-shell modified fluoropolymers as are known in the art in micropowder, pellet, fiber and nanopowder forms), fluorographite, silica, barium sulfate, carbon, carbon black, carbon fluoride, clay, talc, metallic fillers (titanium oxide, aluminum oxide, yttrium oxide, silicon oxide), metal carbides (silicon carbide, aluminum carbide), metallic nitrides (silicon nitride, aluminum nitride), other inorganic fillers (aluminum fluoride, carbon fluoride), colorants, organic dyes and/or pigments, such as azo, isoindolenone, quinacridone, diketopyrrolopyrrole, anthraquinone, and the like, imide fillers (such as polyimide, polyamide-imide and polyetherimide), ketone plastics (such as polyarylene ketones like PEEK, PEK and PEKK), polyarylates, polysulfones, polyethersulfones, polyphenylene sulfides, polyoxybenzoate, and the like may be used in amounts known in the art and/or which may be varied for different properties. All of the fillers herein may be used alone or in combinations of two or more such fillers and additives.

Preferably, any optional fillers used total less than about 30 parts per hundred parts of the combined curable perfluoropolymers in the composition. Organic fillers, providing heat resistance, and plasma resistance (reduced numbers of particles and low weight reduction rates at emission of plasma), include of those mentioned above, organic pigments, imide fillers with imide structures such as polyimide, polyamide imide and polyetherimide, and ketone-based engineering plastics like PEEK, and PEK, with organic pigments being preferred.

Pigmented fillers which are preferred for heat resistance and chemical resistance and having less effect on end characteristics of the molded articles formed from the compositions described herein include quinacridone, diketopyrrolopyrrole and anthraquinone pigments and dyes, with quinacridone being preferred.

Of the inorganic fillers, preferred fillers for shielding plasma effects include aluminum oxide, yttrium oxide, silicon oxide, polyimide and carbon fluoride.

After the polymers are combined, the first and second curable perfluoropolymers in the perfluoroelastomeric composition are cured to form a cured perfluoroelastomeric composition as described herein.

The curable perfluoroelastomeric composition is preferably cured at temperatures and for times which would be traditionally used to form the desired cross-links depending on the cure sites and curatives chose. In any case, the temperatures should be sufficient to allow the curing reaction to proceed until the curable perfluoropolymers in the composition are substantially cured, preferably at least 70% cured. Preferred curing temperatures and times are about 150° C. to about 250° C., for about 5 to about 40 minutes. Following curing, an optional postcure may be used. Acceptable postcure temperatures and times are about 250° C. to about 320° C. for about 5 to about 48 hours.

While curing, the curable perfluoroelastomeric compositions described herein can be formed into a molded article while simultaneously curing using heat and pressure applied by to a mold. Preferably, the combined curable perfluoropolymers are formed into a preform, such as an extruded rope or other shape useful for including the preform in a mold having a recess shaped to receive the preform and for forming a molded article while curing. Optional postcuring can also be carried out preferably under air or nitrogen.

In addition to fillers, it is within the scope of the invention to include additional curable and noncurable perfluoropolymers having varied types, including the same or different cure site monomers to those preferred herein. Additional curatives and cure accelerators, either to work with or accelerate the cure of the first perfluoropolymer and/or the second perfluoropolymer or to cure and/or accelerate cure of any additional optional curable perfluoropolymers may also be included herein. Noncurable perfluoropolymers include those which lack a reactive cure site and are formed from one or more ethylenically unsaturated monomers (such as TFE, HFP and PAVE). Additional curable perfluoropolymers may be any of the curable perfluoropolymers noted herein as well as those having cure sites suitable for crosslinking with organic peroxide cure systems as are known in the art, tetraphenyl tin cures, bisaminophenyl-based cures and the like. Such polymers may be added to develop alternative blends and to modify the properties of the compositions noted herein.

The invention also includes a cured fluorine-containing elastomer formed by curing a curable fluorine-containing composition comprising a blend of a first curable perfluoropolymer comprising tetrafluoroethylene, a first perfluoroalkylvinyl ether and at least one first cure site monomer having at least one cure site, wherein tetrafluoroethylene is present in the first curable perfluoropolymer in an amount of at least about 50 mole percent; a second curable perfluoropolymer comprising tetrafluoroethylene, a second perfluoroalkylvinyl ether and at least one second cure site monomer having at least one cure site, wherein the second curable perfluoropolymer comprises fluoroplastic particles therein; and at least one curative.

Molded articles are also within the scope of the invention which are formed by heat curing and shaping a composition comprising a blend of a first curable perfluoropolymer comprising tetrafluoroethylene, a first perfluoroalkylvinyl ether and at least one first cure site monomer having at least one cure site, wherein tetrafluoroethylene is present in the first curable perfluoropolymer in an amount of at least about 50 mole percent; a second curable perfluoropolymer comprising tetrafluoroethylene, a second perfluoroalkylvinyl ether and at least one second cure site monomer having at least one cure site, wherein the second curable perfluoropolymer comprises fluoroplastic particles therein; and at least one curative.

COMPARATIVE EXAMPLES

Compounds were made with the following formulations using base polymers Dyneon® PFE-133TZ (Polymer A) a fluoroplastic-containing curable perfluoropolymer, available from 3M Corporation, St. Paul, Minn. PFE 133 TZ is of the same basic structure as prior Dyneon® PFE 133 TBX, but is made without PFOA. Such polymer includes a cyano-functionalized PFA perfluoroplastic in an amount of about 20% within a curable perfluoropolymer matrix including a perfluoropolymer including TFE, PAVE and a cyano-containing cure site monomer. Additionally, this polymer was combined with a high-TFE fluoropolymer was a curable perfluoropolymer from Daikin Industries, Ltd. available as GA-500PR (Polymer B), including TFE/PMVE/Cure Site monomer in molar amounts of 69.4 TFE, 30.2 perfluoromethyl vinyl ether (PMVE) and 0.43 cure site monomer, wherein the cure site monomers in the example polymers was $CF_2=CFO(CF_2)_5CN$. Polymers and similar materials like those of Polymer B are described and made set forth in U.S. Pat. Nos. 6,518,366 and 6,878,778, each of which is incorporated herein by reference with respect thereto. Daikin Industries polymer GA500 was also used (Polymer C). Curatives used in these examples included a fluorchemical onion curative E-18346 from 3M Corporation as noted above, an imidoyl-based curative DPIA-65 from Federal State Unitary Enterprise S.V. Lebedev Institute of Synthetic Rubber, Petersburg, Russia having the structure shown below:

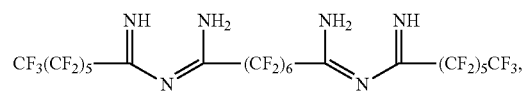
(XII)

and bisaminophenol (BOAP). In one example, a fluorpolymer filler micropowder, Zonyl® MP 1500, available for E.I. DuPont de Nemours & Co., Wilmington, Del., was provided to the sample. The compositions are as set forth in Table 1 in Examples Comp A, Comp B and Comp C and the properties (as discussed further below and in Table 3) are shown in Tables 1 and 2.

EXAMPLES

A series of perfluoropolymers were evaluated and two preferred perfluoropolymers were identified for use in the following examples. The two curable perfluoropolymers included in these examples are the fluoroplastic-containing curable perfluoropolymer, Dyneon® PFE 133 TZ (Polymer A) available from 3M Corporation, St. Paul, Minn. noted as PFE 133 TZ (Polymer A) which is of the same basic structure as prior Dyneon® PFE 133 TBX, but is made without PFOA. Such polymer includes a cyano-functionalized PFA perfluoroplastic in an amount of about 20% within a curable perfluoropolymer matrix including a perfluoropolymer including TFE, PAVE and a cyano-containing cure site monomer.

Also incorporated herein as a high-TFE fluoropolymer was a curable perfluoropolymer from Daikin Industries, Ltd. available as GA-500PR (Polymer B), including TFE/PMVE/Cure Site monomer in molar amounts of 69.4 TFE, 30.2 perfluoromethyl vinyl ether (PMVE) and 0.43 cure site monomer, wherein the cure site monomers in the example polymers was $CF_2=CFO(CF_2)_5CN$. Polymers and similar materials like those of Polymer B are described and made set forth in U.S. Pat. Nos. 6,518,366 and 6,878,778, each of which is incorporated herein by reference with respect thereto.

As curatives, both the compound is 4,4'-[2,2,2-Trifluoro-1-(trifluoromethyl)ethylidene]bis[N1-phenyl-1,2-benzenediamine] ("Nph-AF") from Daikin Industries, Ltd.

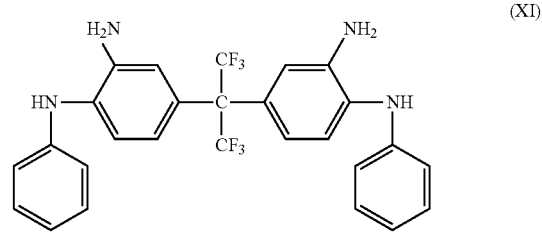 [SMILES: Nc1cc(C(c2ccc(Nc3ccccc3)c(N)c2)(C(F)(F)F)C(F)(F)F)ccc1Nc1ccccc1]
(XI)

Also used herein is a further imidoyl-based curative DPIA-65 from Federal State Unitary Enterprise S.V. Lebedev Institute of Synthetic Rubber, Petersburg, Russia having the structure shown below:

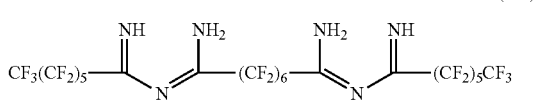

(XII)

Additional curatives tested include bisaminophenol (BOAP) and heptafluorobutylrylamidine (HFBA) and two fluorochemical onium compounds (E-18600 (1) and E-18346 (2)) were incorporated in some of the formulations. Aside from the information provided above, the compositions resulting from blending the above-noted materials in different formulations were unfilled.

Polymer (A) and Polymer (B) were combined with one or more of the curatives (cross-linking agent) noted above and were mixed in the amounts as shown in Table 1. The composition was kneaded with an open roll at 50° C. to prepare a crosslinkable fluorine-containing elastomer composition.

This fluorine-containing elastomer composition was subjected to crosslinking by curing using the various cure cycles shown in Table 1 to make test sample O-rings. With respect to the test samples, curing characteristics and physical properties in the normal state were measured by the following methods. The physical properties, melting behavior and stiction tests for those samples which were tested are shown in Table 1. The curing characteristics are shown in Table 2.

Crosslinkability: With respect to each crosslinkable composition, a vulcanization curve was obtained at 180° C. by using JSR type Curastometer Model II, and a minimum torque ($M_L$), a maximum torque ($M_H$), and induction time ($T_{s2}$) and an optimum vulcanization time ($T_{90}$) were determined.

Physical Properties in the Normal State: According to the ASTM Standards specified in Table 3, a 50% modulus ($M_{50}$) and a 100% modulus ($M_{100}$), a tensile strength ($T_B$), an elongation ($E_B$) and hardness Shore A and Shore M in a normal state (25° C.) were measured along with the specific gravity. Each of the samples but for the Shore A hardness were tested on 9214-sized O-rings.

Testing was conducted in accordance with the following information shown in Table 3.

TABLE 1

| Formulation | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Polymer A (weight ratio) | 50 | 50 | 50 | 50 | 50 | 50 | 50 | 50 | 50 | 50 | 50 |
| Polymer B (weight ratio) | 50 | 50 | 50 | 50 | 50 | 50 | 50 | 50 | 50 | 50 | 50 |
| DPIA-65 | | | | | | 0.5 | | | | | |
| V6 (Nph-AF) | 1 | 1.6 | 1.6 | 1.6 | 2.1 | 1.6 | 1 | 1 | 1.5 | 1.5 | 1 |
| BOAP | 0.5 | | | | | | | | | | |
| HFBA | | | | | | | | 0.5 | 0.25 | 0.5 | 0.25 |
| E-18600 | | | | | | | | | | | |
| E-18346 | | | | | | | | | | | |
| Cure (min/° F.) | 30/360 | 30/360 | 30/360 | 30/360 | 30/360 | 10/360 | 10/360 | 10/360 | 10/360 | 10/360 | 30/370 |
| Post Cure (min/° F.) in air | 2-18-2 | 2-18-2 | 6-16-2 | 24** | 2-18-2 | 2-18-2 | 2-18-2 | 2-18-2 | 2-18-2 | 2-18-2 | 2-18-2 |
| (stepped unless noted) | 554 | 554 | 482 | 450 | 554 | 554 | 554 | 554 | 554 | 554 | 554 |
| $T_B$: psi | 1945 | 1984 | 2343 | 2474 | 1993 | 2494 | | | | | 1187 |
| Eb (%) | 227 | 244 | 226 | 263 | 245 | 232 | | | | | 266 |
| $M_{50}$: psi | 267 | 257 | 325 | 276 | 252 | 288 | | | | | 234 |
| $M_{100}$: psi | 480 | 445 | 589 | 476 | 439 | 508 | | | | | 377 |
| Specific Gravity | 2.079 | 2.058 | 2.059 | 2.058 | 2.055 | 2.059 | | | | | 2.066 |
| Shore A Hardness | 74 | 78 | | 76 | 79 | 80 | | | | | 75 |
| Shore M Hardness | | 80 | 82 | 82 | 81 | 82 | | | | | 80 |
| Comp. set (%) (avg/2)(572° F./70 h), 20% | 41.49 37.41 | 38.32 | 55.56 | | 58.93 | 39.47 | 40.77 | | | | 40.74 |
| Comp. set (%) (avg/2)(572° F./87.45 h), 20%* | | 35.19 38.89 | | | 37.04 35.19 | 37.04 35.19 | | | | | |
| Stiction: lbs | 47.87 | 40.48 | 56.28 | 59.37 | 40.86 | 54.20 | | | | | |
| KV $O_2$ dir. Plasma, 75 sccm, 90 min (% loss) | 0.866 | 0.6575 | 2.87 | 0.889 | 0.96 | | | | | | |
| Thermo (380° C./2 h) melting (Yes/No) | No | No | | | No | No | | | | | |
| Thermo weight loss (%) | 2.514 | 2.868 | | | 3.355 | 2.227 | | | | | |

*Comp. set in av. 2 runs tested @ 600°, 615°, 625°, and 635° F. for Ex. 1 @70 h, 20% yielded 48.15, 48.21, 66.08 and 73.21 respectively
**straight

| Formulation | Ex. 12 | Ex. 13 | Ex. 14 | Ex. 15 | Ex. 16 | Ex. 17 | Ex. 18 | Ex. 19 | Comp 1 | Comp 2 | Comp 3 |
|---|---|---|---|---|---|---|---|---|---|---|---|
| Polymer A (weight ratio) | 50 | 50 | 50 | 50 | 50 | 50 | 50 | 50 | 117.5 | 50 | 50 |
| Polymer B (weight ratio) | 50 | 50 | 50 | 50 | 50 | 50 | 50 | 50 | | | 50 |
| Polymer C (weight ratio) | | | | | | | | | | 50 | |
| DPIA-65 | | | 0.2 | | 0.01 | | | | | 3 | |
| V6 (Nph-AF) | 1 | 1.3 | 1.1 | 1 | 1.6 | 1.6 | 1.6 | | | | |
| BOAP | | | | | | | | | | | 1.1 |
| HFBA | | | | | | 0.01 | 0.1 | | | | |
| E-18600 | | | | 1.5 | | | | 3 | | | |
| E-18346 | 0.65 | | | 0.65 | | | | | 1.5 | 1.25 | |
| Cure (min/° F.) | 5/370 | 30/360 | 10/360 | 50/370 | 30/360 | 30/360 | 30/360 | 30/360 | 15/370 | 20/350 | 30/360 |
| Post Cure (min/° F.) in air | 2-18-2 | 2-18-2 | 2-18-2 | 2-18-2 | 2-18-2 | 2-18-2 | 2-18-2 | 2-18-2 | 6-18-2 | 2-18-2 | 2-18-2 |
| (stepped unless noted) | 554 | 554 | 554 | 554 | 554 | 554 | 554 | 554 | 482 | 554 | 554 |
| $T_B$: psi | 1252 | 2353 | 2486 | | | | | 2299 | 850 | 1025 | 2108 |
| Eb (%) | 275 | 256 | 266 | | | | | 294 | 184 | 266 | 229 |
| $M_{50}$: psi | 236 | 238 | 244 | | | | | 258 | 387 | 175 | 223 |
| $M_{100}$: psi | 377 | 417 | 420 | | | | | 414 | 584 | 285 | 437 |

TABLE 1-continued

| | | | | | | | | |
|---|---|---|---|---|---|---|---|---|
| Specific Gravity | 2.075 | 2.057 | 2.057 | | 2.074 | 2.067 | 2.0435 | 2.054 |
| Shore A Hardness | 71 | 75 | 71 | | 75 | | 65 | 71 |
| Shore M Hardness | 79 | 81 | 79 | | | | | |
| Comp. set (%) (avg/2)(572° F./70 h), 20% | 55.56# 55.56 | 42.86 | 46.40 | | 57.41# | 100 | 50/split | 44.64 |
| Stiction: lbs | | 63.70 | 60.15 | | 77.98 | 46.14 | | |
| KV $O_2$ dir. plasma (75 sccm, 300 mT, 150 W, 90 min. (% loss) | | 1.707 | 1.482 | | | 4.60* | 22.30** | |
| Thermo (380° C./2 h) melting (Yes/No) | | No | Slight | | | melted | melted | melted |
| Thermo weight loss (%) | | 2.765 | | | | 1.7 | 1.256 | 1.302 |

Ex. 12 comp. set@625° F./70 h, 20% was 61.11 and Ex. 19 comp. set @70 h, 20% and 615° and 635° F., was 58.34 and 78.49, respectively
*$NF_3$ 0.5%
**$NF_3$ 0.3%

TABLE 2

| Example/Cure Characteristic | $M_H$ | $M_L$ | $T_{S2}$ | $T_{50}$ | $T_{90}$ |
|---|---|---|---|---|---|
| 1 | 12.17 | 3.64 | 8.69 | 13.76 | 19.44 |
| 2 | 12.55 | 3.66 | 13.82 | 22.86 | 30.25 |
| 5 | 12.45 | 3.37 | 12.85 | 21.28 | 29.04 |
| 6 | 11.49 | 2.63 | 0.08 | 1.55 | 4.01 |
| 7 | 9.98 | 3.77 | 0.64 | 0.85 | 1.95 |
| 8 | 9.3 | 4.47 | 0.68 | 0.76 | 1.48 |
| 9 | 10.26 | 4.6 | 0.8 | 1.01 | 2.32 |
| 10 | 9.12 | 4.38 | 0.68 | 0.75 | 1.43 |
| 11 | 8.92 | 2.77 | 22.33 | 26.97 | 47.28 |
| 12 | 8.92 | 2.77 | 22.33 | 26.97 | 47.28 |
| 13 | 12.53 | 3.49 | 13.09 | 21.99 | 28.74 |
| 14 | 11.94 | 3.74 | 3.67 | 6.09 | 9.71 |
| 15 | 8.55 | 2.79 | 19.33 | 22.74 | 43.53 |
| 16 | 12.57 | 3.32 | 12.58 | 27.16 | 36.31 |
| 17 | 12.4 | 3.31 | 12.65 | 28.62 | 38.47 |
| 18 | 12.25 | 3.28 | 11.4 | 18.32 | 24.81 |
| 19 | 11.30 | 2.92 | 3.12 | 4.04 | 7.94 |
| Comp 1 | 6.57 | 0.92 | 4.42 | 5.2 | 11.42 |

Examples 7-10 were not moldable; Comp 1, $M_H - M_L$ - 5.65

TABLE 3

| Properties | Testing Method |
|---|---|
| $M_H$: lb inch | ASTM D 5289, average of 2 min sets; 360° F. (182.2° C.)/60 min. |
| $M_L$: lb inch | |
| $T_{50}$ (min) | |
| $T_{90}$ (min) | |
| $T_{s2}$ (min) | |
| $T_b$: psi | Average of 10 O-rings, 20"/min, ASTM D 1414, ASTM D 412 |
| $E_b$ (%) | |
| $M_{100}$: psi; $M_{50}$: psi | |
| Specific Gravity | ASTM D 792 |
| Shore M Hardness | ASTM D 2240 |
| Shore A Hardness | ASTM D 2240 |
| Compression set (%) (572° F./70 h) | ASTM D 1414/ASTM D 395 average of 10 |
| Compression set (%) (572° F./87.45 h) | ASTM D1414/ASTM D 395 average of 10 |
| Compression set (%) (600° F., 70 h) | ASTM D 1414/ASTM D 395 average of 10 |
| Compression set (%) (615° F., 70 h) | ASTM D 1414/ASTM D 395 average of 10 |
| Compression set (%) (625° F., 70 h) | ASTM D 1414/ASTM D 395 average of 10 |
| Compression set (%) (635° F., 70 h) | ASTM D 1414/ASTM D 395 average of 10 |
| Stiction: lbs. (N) | Compression 25% between two Aluminum substrates, conditioning 392° F. (200° C.) for 24 hrs and cool for 1 h and then push O-ring of Al at 0.5"/min (0.2 mm/second). |
| KV direct $O_2$ plasma 90 min. (% loss) | Power 150 W, flow 75 standard $cm^3$ per minute, pressure: 300 mT, time: 90 min. |
| Thermo Test | 360° C.; 2 h characterizing melting and % weight loss |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A curable fluorine-containing elastomer composition formed by combining
    a first unfilled curable perfluoropolymer comprising tetrafluoroethylene, a first perfluoroalkylvinyl ether and at least one first cure site monomer having at least one cure site, wherein tetrafluoroethylene is present in the first curable perfluoropolymer in an amount of at least about 50 mole percent;
    a second curable perfluoropolymer comprising tetrafluoroethylene, a second perfluoroalkylvinyl ether and at least one second cure site monomer having at least one cure site, wherein the second curable perfluoropolymer comprises fluoroplastic particles in a matrix of the second curable perfluoropolymer, wherein such fluoroplastic has a functional curesite and is incorporated into the second curable perfluoropolymer matrix; and
    at least one curative.

2. The curable fluorine-containing elastomer composition according to claim 1, wherein the first curable perfluoropolymer comprises at least about 60 mole percent tetrafluoroethylene.

3. The curable fluorine-containing elastomer composition according to claim 2, wherein the first curable perfluoropolymer comprises at least about 70 mole percent tetrafluoroethylene.

4. The curable fluorine-containing elastomer composition according to claim 1, wherein the first curable perfluoropolymer comprises about 60 to about 95 mole percent tetrafluoroethylene.

5. The curable fluorine-containing elastomer composition according to claim 1, wherein the composition comprises the first curable perfluoropolymer and the second curable perfluoropolymer in a ratio of about 25 to about 75 mole percent to about 75 to about 25 mole percent.

6. The curable fluorine-containing elastomer composition according to claim 5, wherein the composition comprises the first curable perfluoropolymer and the second curable perfluoropolymer in a ratio of about 40 to about 60 mole percent to about 60 to about 40 mole percent.

7. The curable fluorine-containing elastomer composition according to claim 1, wherein the composition comprises the first curable perfluoropolymer and the second curable perfluoropolymer in a ratio of about 50 to about 50.

8. The curable fluorine-containing elastomer composition according to claim 1, wherein each of the at least one cure site monomers is present in an amount of about 0.01 to about 10 mole percent respectively in each of the first curable perfluoropolymer and the second curable perfluoropolymer.

9. The curable fluorine-containing elastomer composition according to claim 1, wherein the at least one curative is present in an amount of about 0.01 to about 5 parts by weight per 100 parts by weight of the perfluoropolymers in the composition.

10. The curable fluorine-containing elastomer composition according to claim 9, wherein the at least one curative is present in an amount of about 0.01 to about 2 parts by weight per 100 parts by weight of the perfluoropolymers in the composition.

11. The curable fluorine-containing elastomer composition according to claim 1, wherein the at one cure site in the at least one cure site monomer in the first curable perfluoropolymer is a nitrogen-containing cure site.

12. The curable fluorine-containing elastomer composition according to claim 1, wherein the at least one cure site in the at least one cure site monomer in the first curable perfluoropolymer is selected from the group consisting of cyano, carboxyl, carbonyl, alkoxycarbonyl, and combinations thereof.

13. The curable fluorine-containing elastomer composition according to claim 1, wherein the fluoroplastic particles are present in the second curable fluoropolymer as a result of melt-blending or blending during latex polymerization.

14. The curable fluorine-containing elastomer composition according to claim 13, wherein the second curable fluoropolymer comprises fluoroplastic particles as a result of blending during latex polymerization, and the fluoroplastic particles comprise a nitrogen-containing cure site monomer, and wherein the functional curesite of the fluoroplastic in the matrix of the second curable perfluoropolymer is a cyano curesite and the curesite monomer of the second curable perfluoropolymer has a cure site selected from the group consisting of halogen, nitrogen-containing groups, carboxyl, alkoxycarbonyl and combinations thereof.

15. The curable fluorine-containing elastomer composition according to claim 1, wherein the at least one curative is selected from the group consisting of fluorinated imidoylamidines; bisaminophenols; bisamidines; bisamidoximes; bisamidrazones; monoamidines; monoamidoximes; monoamidrazones; biasminothiophenols; bisdiaminophenyls; aromatic amines having at least two crosslinkable groups represented by the formula (II):

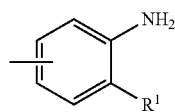

(II)

wherein $R^1$ are the same or different and each is $-NH_2$, $-NHR^2$, $-OH$ or $-SH$; and $R^2$ is a monovalent organic group;

compounds represented by the formula (III):

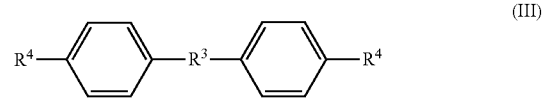

(III)

wherein $R^3$ is $-SO_2-$, $-O-$, $-CO-$, an alkylene group having 1 to 6 carbon atoms, a perfluoroalkylene group having 1 to 10 carbon atoms or a single bond and $R^4$ is

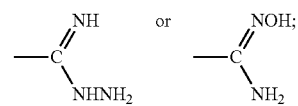

compounds represented by Formula (IV):

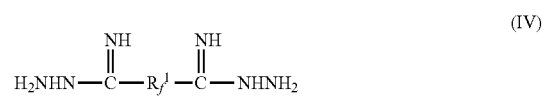

(IV)

wherein $R_f^1$ is a perfluoroalkylene group having 1 to 10 carbon atoms; and compounds represented by the formula (V):

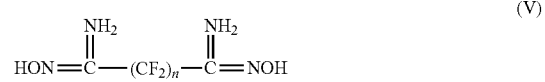

(V)

in which n is an integer of 1 to 10; and combinations thereof, wherein the at least curative is capable of reacting with the least one cure site in the at least one first perfluoropolymer and the at least one cure site in the second perfluoropolymer to crosslink the at least one perfluoropolymer and the at least one second perfluoropolymer in the composition.

16. The curable fluorine-containing elastomer composition according to claim 15, wherein the at least one curative is selected from the group consisting of aromatic amines having at least two crosslinkable groups represented by the formula (II), wherein R1 is $-NHR_2$; fluorinated imidoylamidines; bisaminophenols; and combinations thereof.

17. The curable fluorine-containing elastomer composition according to claim 16, wherein the at least one curative is selected from the group consisting of:

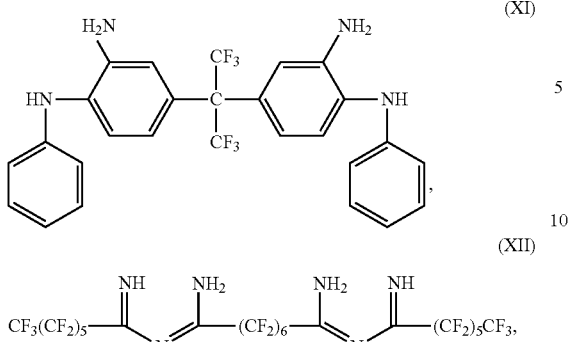

(XI)

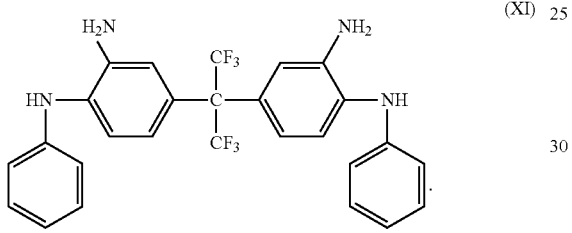

(XII)

bisaminophenol, bisaminophenol AF, and combinations thereof.

18. The curable fluorine-containing elastomer composition according to claim 1, wherein the elastomer composition is a perfluoroelastomer composition and the at least one curative comprises

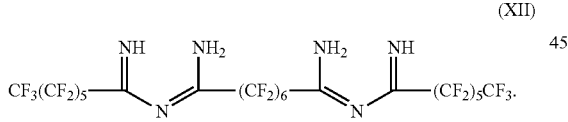

(XI)

19. The curable fluorine-containing elastomer composition according to claim 18, wherein the at least one curative further comprises bisaminophenol or bisaminophenol AF.

20. The curable fluorine-containing elastomer composition according to claim 18, wherein the elastomer composition is a perfluoroelastomer composition and the at least one curative further comprises

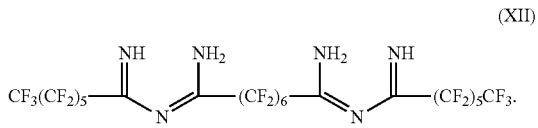

(XII)

21. The curable fluorine containing elastomer composition according to claim 1, wherein the elastomer composition is a perfluoroelastomer composition and the at least one curative comprises (XII)

CF$_3$(CF$_2$)$_5$—C(=NH)—N=C(NH$_2$)—(CF$_2$)$_6$—C(NH$_2$)=N—C(=NH)—(CF$_2$)$_5$CF$_3$.

22. The curable fluorine-containing elastomer composition according to claim 1, wherein the cure site monomer in the first curable fluoropolymer and/or the second curable fluoropolymer is CF$_2$=CFO(CF$_2$)$_5$CN.

23. A curable perfluoroelastomer composition formed by combining a first curable perfluoropolymer comprising tetrafluoroethylene, a first perfluoroalkylvinyl ether and at least one first cure site monomer having at least one cure site, wherein the tetrafluoroethylene is present in the first curable perfluoropolymer in an amount of at least about 50 mole percent;

a second curable perfluoropolymer comprising tetrafluoroethylene, a second perfluoroalkylvinyl ether and at least one second cure site monomer having at least one cure site, wherein the second curable perfluoropolymer comprises fluoroplastic particles in a matrix of the second curable perfluoropolymer, wherein such fluoroplastic has a functional curesite and is incorporated into the second curable perfluoropolymer matrix; and at least one curative the at least one curative is selected from the group consisting of:

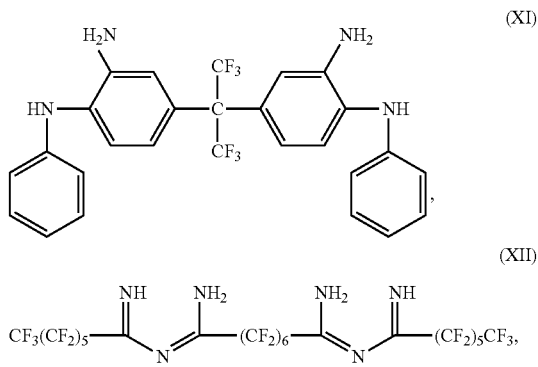

(XI)

(XII)

CF$_3$(CF$_2$)$_5$—C(=NH)—N=C(NH$_2$)—(CF$_2$)$_6$—C(NH$_2$)=N—C(=NH)—(CF$_2$)$_5$CF$_3$, bisaminophenol, bisaminophenol AF, and combinations thereof, wherein at least one of the cure site monomer in the first curable perfluoropolymer and the cure site monomer in the second curable perfluoropolymer is CF$_2$=CFO(CF$_2$)$_5$CN, and wherein the second curable perfluoropolymer comprises fluoroplastic particles in the second curable fluoropolymer matrix as a result of blending during latex polymerization, and wherein the functional cure site of the fluoroplastic particles is a cyano group and the second fluoropolymer comprises a nitrogen-containing cure site monomer.

24. The curable perfluoroelastomer composition according to claim 23, wherein the tetrafluoroethylene is present in the first curable perfluoropolymer in an amount of at least about 60 mole percent.

25. The curable perfluoroelastomer composition according to claim 24, wherein the tetrafluoroethylene is present in the first curable perfluoropolymer in an amount of at least about 70 mole percent.

26. The curable perfluoroelastomer composition according to claim 23, wherein the tetrafluoroethylene is present in the first curable perfluoropolymer in an amount of about 60 mole percent to about 95 mole percent.

27. A cured fluorine-containing elastomer formed by curing a curable fluorine-containing composition which is formed by combining a first curable perfluoropolymer comprising tetrafluoroethylene, a first perfluoroalkylvinyl ether and at least one first cure site monomer having at least one cure site, wherein tetrafluoroethylene is present in the first curable perfluoropolymer in an amount of at least about 50 mole percent;

a second curable perfluoropolymer comprising tetrafluoroethylene, a second perfluoroalkylvinyl ether and at least one second cure site monomer having at least one cure site, wherein the second curable perfluoropolymer comprises fluoroplastic particles in a matrix of the second curable perfluoropolymer, wherein such fluoroplastic has a functional curesite and is incorporated into the second curable perfluoropolymer matrix; and at least one curative, wherein the fluoroplastic having the curesite and incorporated into from the second curable fluoropolymer matrix remains in the matrix of the cured fluoroelastomer after combining and curing the first and the second curable fluoropolymers.

28. A molded article formed by heat curing and shaping a composition formed by combining a first curable perfluoropolymer comprising tetrafluoroethylene, a first perfluoroalkylvinyl ether and at least one first cure site monomer having at least one cure site, wherein tetrafluoroethylene is present in the first curable perfluoropolymer in an amount of at least about 50 mole percent;

a second curable perfluoropolymer comprising tetrafluoroethylene, a second perfluoroalkylvinyl ether and at least one second cure site monomer having at least one cure site, wherein the second curable perfluoropolymer comprises fluoroplastic particles in a matrix of the second curable perfluoropolymer, wherein such fluoroplastic has a functional curesite and is incorporated into the second curable perfluoropolymer matrix; and at least one curative.

* * * * *